July 7, 1942.　　　H. I. WATERMAN ET AL　　　2,288,982
PRODUCTION OF EXTRUSION PRODUCTS FROM DIENE HYDROCARBONS
Filed April 3, 1939　　　2 Sheets—Sheet 1
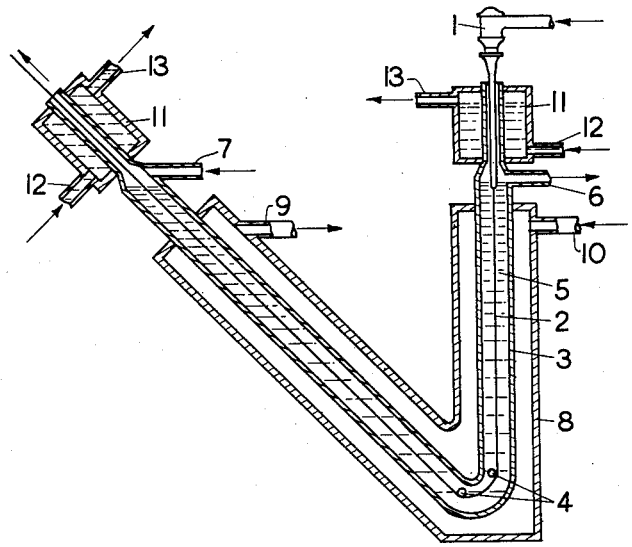
Fig. I
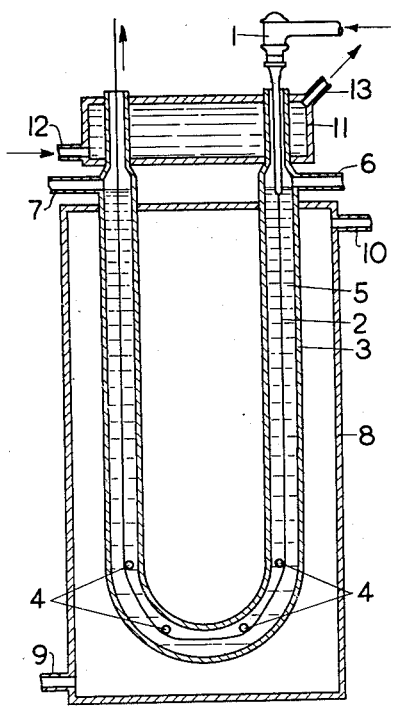
Fig. II
Inventors: Hein Israel Waterman
Willem Leendert Johannes de Nie
By their Attorney:

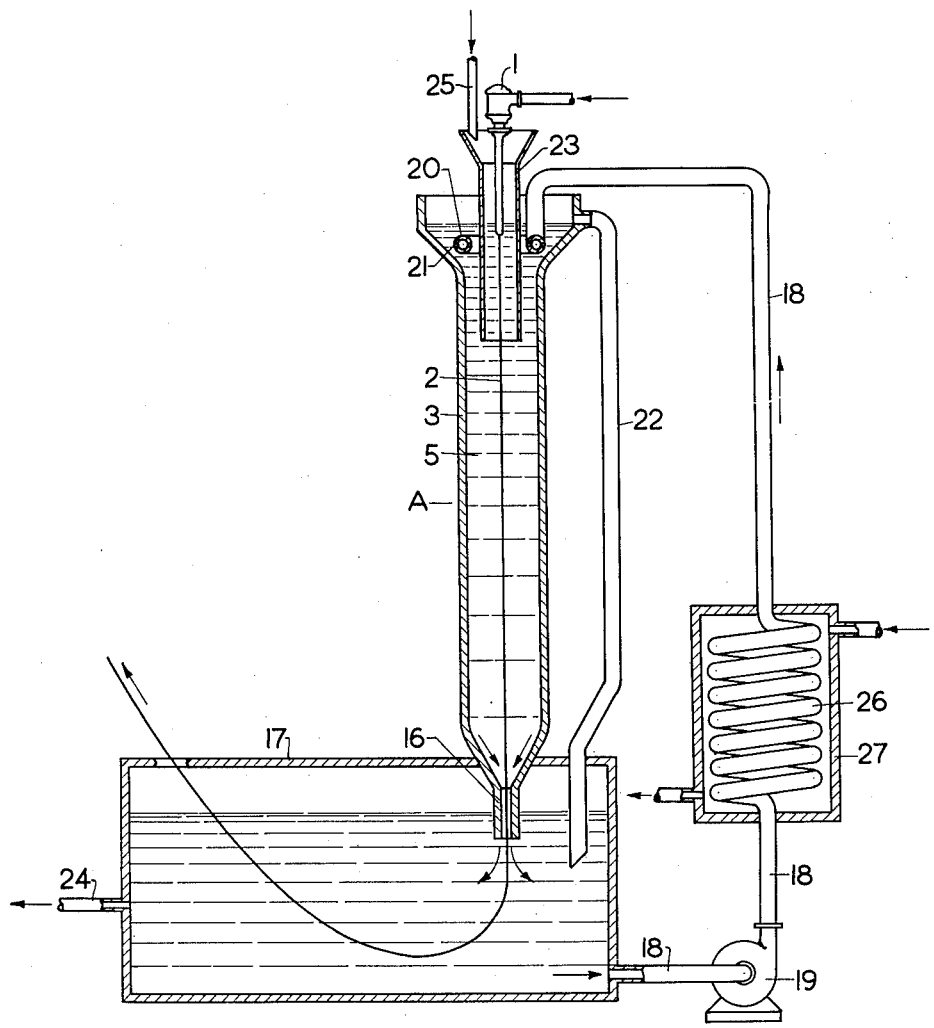
Fig. III

Patented July 7, 1942

2,288,982

UNITED STATES PATENT OFFICE 2,288,982

PRODUCTION OF EXTRUSION PRODUCTS FROM DIENE HYDROCARBONS

Hein Israel Waterman and Willem Leendert Johannes de Nie, Delft, Netherlands, assignors to Shell Development Company, San Francisco, Calif., a corporation of Delaware Application April 3, 1939, Serial No. 265,745

10 Claims. (Cl. 18—54)

The present invention relates to the production of non-supported objects having at least one small dimension from solutions of plastic, non-distillable polymerization products of diene hydrocarbons. More particularly the invention relates to the production of filaments, fibers, threads and similar articles of small cross-section from polymers of butadiene. Since the articles produced according to the present invention are formed by extruding a solution of the polymerization product through a die, orifice or nozzle, they are hereinafter referred to as "extrusion products."

It is known that useful articles such as filaments, fibers, threads, ribbons, foils and the like can be produced from polymerization products of diene hydrocarbons such as, for instance butadiene, isoprene and homologues thereof. The products produced from these polymerization products, although possessing certain desirable properties not possessed by other synthetic extrusion products have nevertheless until quite recently been difficult to produce and of inferior quality and therefore of little commercial importance. Recently, however, as a result of careful systematic study, improvements in the method of producing extrusion products from polymerized diene hydrocarbons have been made which overcome many of the previous difficulties and make possible the production of products of greatly increased quality. These improvements may be divided into several categories, for instance, improvements in the methods of polymerizing and preparing the spinning solutions, improvements in the methods of extruding (spinning), and improvements in the methods of handling, hardening and otherwise treating the formed extrusion products.

In order that the finished product shall be suitable for commercial application it is necessary that the filament, fiber or other product be tough and have a high tensile strength, be capable of withstanding relatively high temperatures without softening, be hard and yet supple and pliable, possess the desired degree of extensibility, and retain its flexibility and extensibility for long periods of time without becoming brittle. In order to produce the best products having these characteristics, which it will be noted are quite different than those usually associated with synthetic rubber, it is necessary that specially prepared polymers be employed and that the fabrication of the product and hardening treatment be executed in a suitable manner under carefully controlled conditions. The diene hydrocarbon should be polymerized, for example, in such a manner that predominantly linear polymers of a fixed, predetermined average molecular weight are formed. This may be accomplished by the proper choice of polymerization catalyst and careful control of polymerization conditions and/or by "fractionating" the polymerized diene hydrocarbon and utilizing only that portion of the polymer that has the desired characteristics.

While the effect of various copolymers, interpolymers, impurities, solvents, catalysts, and methods of polymerizing have a pronounced influence on the properties of the finished product, its properties are no less dependent upon variations in the method of forming and treating the extrusion product. The accepted method for the fabrication of these extrusion products consists essentially in extruding a solution of the polymer into a long, vertically disposed, heated tube wherein the solvent is vaporized and removed and the filament given sufficient heat treatment to render it strong enough for subsequent handling and further hardening. This dry spinning method has certain inherent defects which result in a product of impaired strength, color, etc.

In our co-pending application Serial No. 197,032, filed March 19, 1938 now Patent No. 2,198,927, of which the present application is a continuation-in-part, there is described a method for the production of filaments and other extrusion products from polymers of diene hydrocarbons by a "wet spinning method." According to the process of said co-pending application a solution of the polymer in a solvent such as benzene, cyclohexane or methylene chloride is extruded into a "coagulating liquid" such as ethyl alcohol wherein a portion of the solvent diffuses from the polymer solution to yield a "coagulated" filament. The sticky and tender "coagulated" filament issuing from the "coagulating bath" is immediately subjected to a second "wet treatment" wherein a preliminary hardening of the filament takes place. The filament issuing from the preliminary hardening treatment which is now sufficiently strong and non-sticky to be handled is finally subjected to a hardening treatment, preferably according to the process of our copending application, Serial No. 204,226, filed April 25, 1938, to impart the desired tensile strength and degree of extensibility. Although the execution of the above-described process requires special care and precaution due to the extreme tenderness and stickiness of the coagulated filament, the process has the advantage over the dry spinning methods of yielding products of superior quality.

It has now been found that the wet spinning process may be considerably improved and simplified by executing the spinning in a specific manner, by employing certain combinations of solvents and "coagulating liquids," and by executing the "coagulation treatment" under certain conditions.

According to a preferred embodiment of the present invention the polymer solution is spun vertically and the primary coagulation of the extruded filament is effected while the filament, suspended in a substantially vertical position, passes downward through the coagulant. After the extruded polymer is sufficiently coagulated to withstand withdrawing without parting, it is passed under suitable guides and withdrawn from the coagulating bath. This method of spinning and coagulating the filament of diene hydrocarbon polymers may be conveniently executed using a coagulating bath having a V or U-shaped cross-section, the spinning leg of which is substantially vertically disposed. In order that our invention may be more easily understood reference may be had to the attached drawings. Figures I and II represent sections in elevation of two coagulating baths which may be conveniently employed according to this embodiment of our invention. Another embodiment of our preferred vertical spinning method which allows the filament to be stretched 600% or more without rupturing is illustrated in Fig. III which shows a section in elevation of a coagulating bath which may be conveniently employed for this purpose. In Figures I and II, 2 represents the extruded filament issuing from the spinning nozzle 1; 3 represents a tubular chamber having a V-shaped cross-section in Fig. I and a U-shaped cross-section in Fig. II; 4 represents suitable guides under which the coagulated filament passes. The coagulant 5 is passed through the apparatus either concurrent or countercurrent to the movement of the filament. When the flow is countercurrent the fresh coagulating liquid is introduced via an inlet 7 at the desired rate and the spent coagulating liquid, containing a permissible amount of solvent, is withdrawn via an exit 6.

The fresh coagulant is preferably introduced into the coagulant bath at such a rate that the exit coagulant liquid contains the desired concentration of solvent extracted from the coagulating filament. The permissible concentration of solvent in the coagulant liquid varies considerably depending upon the solvent, coagulant and temperature employed and may be easily adjusted to best suit any particular circumstance by varying the rate at which the fresh coagulant is introduced. The solvent and coagulant may be recovered substantially pure from the coagulant liquid, removed from the bath, by any suitable process, for example, in most cases by fractional distillation, and reused.

In Figure III, as in Figures I and II, 1 represents a suitable spinning nozzle; 2 represents the extruded filament; 3 represents a tubular coagulation chamber, and 5 represents the coagulant. According to this embodiment of the invention the vertically disposed tube 3 is provided with a constriction 16 located at some distance below the liquid level in the tube, for example, as shown in Figure III, at the bottom. The constriction may, if desired, be a simple orifice, but is preferably somewhat lengthened and is chosen of such cross-section and length as will allow the easy passage therethrough of the extruded filament and a steady flow of coagulant at a relatively high velocity. Instead of being cylindrical as shown, the constricted channel 16 may also, if desired, be tapered, i. e., more restricted near the bottom than near the top. Furthermore, instead of a single restricted channel as shown in Figure III, one or more additional restricted passages (not shown), preferably less restricted than the lowermost restriction 16, may be provided at convenient intervals throughout the length of the tube 3, for instance at the height designated by A.

The coagulant and the extrusion product issuing from the restricted passage 16 are received in a chamber 17 containing a quantity of the coagulant, and the coagulated filament is withdrawn therefrom. In order to maintain a constant level of coagulant in the coagulating chamber 3, the necessary quantity of coagulant is withdrawn from the lower chamber 17 via a pipe 18 and pump 19 and returned to the top of the coagulation chamber. The recycled coagulant may, if desired, be evenly and quietly discharged at the top of the coagulation chamber by means of an annular pipe 20 provided with a plurality of small openings 21. The liquid level may, if desired, be conveniently maintained constant by recycling a slight excess of coagulant and allowing the excess to return to chamber 17 via an overflow 22.

In order that the extruded solution of polymer shall not be ruptured by the agitation of the coagulant, caused by the discharge of the recycled material, the apparatus is preferably provided with a concentric partition 23, open at the bottom and extending from a convenient depth below the liquid level to a point somewhat above the liquid level. The partition 23 may also, if desired, be tapered as well as of the cylindrical form shown.

During the execution of the process the coagulant dissolves solvent from the coagulating filament and would therefore shortly become ineffective if it were not refreshed. To this purpose a quantity of coagulant is removed from the system at a convenient location such as, for instance, via an outlet 24 to the lower chamber and an equivalent amount of fresh coagulant is introduced slowly into the inner part of the partition 23 via a feed line 25, the removal and addition being adjusted to maintain the desired composition of the coagulant with respect to the solvent concentration.

The coagulant flowing downward through the chamber 3 and restricted passage 16 simultaneously coagulates, conducts and stretches the extruded filament. According to this embodiment of the vertical spinning method very fine filaments may be produced in which the molecules are well oriented in the direction of the length of the filament. This is evidenced by the greatly increased double refraction of the filament. The method is furthermore capable of producing well coagulated filaments at the very high rate of from 60 to at least 160 meters per minute.

The above-described vertical spinning methods are especially advantageous in such cases as the present where the coagulation process is relatively slow. When spinning vertically according to the preferred embodiment of the invention unusually dilute solutions of the polymer may be employed. For example, we have found that solutions containing only 10% or less of dissolved polymer may be conveniently spun according to this method. This is advantageous since it obviates the concentrating of the polymer solution, facilitates the removal of foreign matter such as catalyst particles, dirt, dust, lint, etc., facilitates the complete homogenizing of the polymer, allows lower spinning pressures and allows the fabrication of filaments of low dernier from inexpensive orifices. Since the weight of the coagulating filament is to a large measure counterbalanced by the buoyant effect of the coagulating liquid, very fine filaments may be spun with simultaneous stretching without rupture of the filament.

The present process is applicable to the production of extrusion products having at least one small dimension (preferably not greater than about 1 mm.) and becomes more advantageous, in general, as the cross-section of the extrusion product is decreased. Thus, it is of particular advantage for the production of artificial filaments having diameters in the order of 0.01 mm. When producing filaments, for example, the dernier number of the product depends upon the size of the spinning orifice, the concentration of the polymer solution and the degree, if any, of stretching of the filament.

The preferable spinning rate depends upon the particular diene polymer employed, the cross-section of the extrusion product, the spinning conditions and as shown below to a great extent upon the solvent and/or coagulant employed, and may vary from a few meters per minute up to 160 meters a minute or higher.

The present invention is applicable to the fabrication of extrusion products of small cross-section from the polymerization products of any of the diene hydrocarbons which are capable of being polymerized to tough or hard materials; for example, while the invention is mainly concerned with the polymerization products of butadiene, polymerization products of cyclopentadiene, and butadiene substituted in one or more positions by a hydrocarbon radical, for example, isoprene, piperylene, phenyl butadiene and the like are also applicable. By "a polymerization product of a diene hydrocarbon" we not only mean the polymers of single diene hydrocarbons, mixtures of polymers and interpolymers of diene hydrocarbons, but we mean to include the polymeric products obtained by copolymerizing and/or interpolymerizing diene hydrocarbons with minor quantities of other polymerizable materials such as vinyl chloride, vinyl acetate, vinyl bromide, chloroprene, styrene, esters of methacrylic acid, compounds of the structure

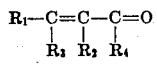

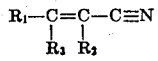

and

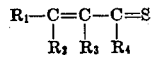

wherein $R_1$, $R_2$, $R_3$ and $R_4$ represent hydrogen atoms and/or organic radicals, and the like. For example, polymers made by polymerizing butadiene containing a small amount of a polymerizable vinyl compound such as, in particular, vinyl acetate, vinyl chloride or vinyl bromide, yield products having a lower extensibility and greater tensile strength. Similarly, small quantities of other materials such as compatible resins, plasticizing agents, and the like, may be used to impart special characteristics to the products. Plasticizing agents such as dibutyl phthalate, tricresyl phosphate, etc., may in general be employed, for example, in quantities up to about 20% by weight of the polymer. All of the above-mentioned polymerized materials consisting essentially of polymers of diene hydrocarbons are intended to be comprehended by the term "a polymerization product of a diene hydrocarbon."

While, as previously stated, the mode of polymerization has a far reaching effect upon the character and properties of the product, the invention is not necessarily restricted to any particular mode of polymerizing, nor to the use of any particular type of catalyst. The diene hydrocarbon may be polymerized by heating or under widely varying conditions with any one of a number of polymerization catalysts and the resulting polymer "fractionated" to separate the most desirable polymerization product. Suitable catalysts applicable for the purpose include the alkali and alkali earth metals, their mixtures and alloys, peroxides such as benzoyl peroxide, ozonides such as varvene ozonide, certain enzymes, the halides of amphoteric elements such as $SnCl_4$, $PCl_5$, $AlCl_3$, $BF_3$, etc., as also various other weaker acting polymerization catalysts such as $SO_2Cl_2$, $P_2O_5$, $POCl_3$, etc. Of these catalysts, it is found that those of the first class, namely the alkali and alkali earth metals and their mixtures and alloys are very efficient for the polymerization of diene hydrocarbons and yield products having excellent properties. The polymerization, using these catalysts, is preferably executed at a temperature not exceeding 50° C. The other types of catalysts are known to produce polymerization products of different characteristics, and several of them are mainly recommended for the polymerization of diene hydrocarbons with other substances.

The polymerization, if desired, may be carried out in the presence of any suitable solvent, or part or all of the solvent may be added after the desired degree of polymerization has taken place. Also "emulsion polymerization" may be carried out. Before spinning, the polymer is carefully freed of catalyst particles, dust, lint and other foreign matter, made up to the desired concentration in a suitable solvent, and thoroughly homogenized.

As examples of some applicable solvents may be mentioned aromatic hydrocarbons such as benzene, toluene, xylene, para-cymene, etc.; cyclo-paraffin hydrocarbons such as methyl cyclopentane, cyclohexane, cyclohexene, etc.; chlorinated hydrocarbons such as chloroform, carbon tetrachloride, methylene chloride, dichlorethane, dichlorethylene, chlorobenzene, hexachlorethane, etc.; ethers such as diethyl ether, methyl tertiary butyl ether, dioxane, dimethyl dioxane, etc.; esters such as ethyl acetate, benzyl acetate, etc.; nitrogen-containing compounds such as quinoline, alpha and gamma alkylated quinolines, morpholin, etc.; and in many cases carbon disulfide, diacetals, mesityl oxide, chloralhydrate, trichloracetic acid amide, etc. Two or more solvents may be used in conjunction and the solvent may moreover contain permissible proportions of non-solvents such as the various coagulants which are miscible therewith. The solution of the polymerization product of the diene hydrocarbon may also contain dyes, small quantities of waxes, or other materials intended to impart special characteristics to the products. If it is desired, for instance, to produce colored products, suitable dyes which are soluble in the polymer solution, but preferably relatively insoluble in the coagulant used, may be incorporated into the polymer solution before extruding.

The function of the coagulant is to dissolve the solvent from the extruded filament of polymer solution without appreciably dissolving the polymer, thus producing a coagulated filament sufficiently strong and non-sticky to be further processed. Consequently any material or mixture of materials capable of performing this simple function may be used. The coagulant, in general, preferably contains one or more substances of the following groups.

1. Neutral coagulants having an appreciable solubility in water and containing oxygen-containing hydrophile groups, such as methyl alcohol, ethyl alcohol, isopropyl alcohol, butyl alcohols, hexyl alcohols, octyl alcohols, lauryl alcohol, cyclohexanol, benzyl alcohol, ethylene glycol, glycerol, benzaldehyde, butyraldehyde, methyl ethyl ketone, acetophenone, diacetone alcohol, and the like.

2. Basic coagulants having an appreciable solubility in water and containing amino hydrophile groups, such as aniline, methyl aniline, ethanol amine, di-ethanolamine, tri-ethanolamine, di-propyl amine, cyclohexyl amine, ethylene diamine, phenylene diamines, phenyl hydrazine, and the like.

3. Acidic coagulants having an appreciable solubility in water and containing carboxylic or sulfonic acid hydrophile groups, such as acetic acid, propionic acid, benzoic acid, cinnamic acid, malonic acid, salicylic acid, glutaric acid, lactic acid, tartaric acid, phthalic acid, benzene sulfonic acid, ethionic acid, and the like.

The coagulant liquid employed may consist of a single liquid substance of one of the above-mentioned classes or may contain two or more coagulating materials either in a mixture or in aqueous solution. The coagulant may, moreover, contain other materials which tend to enhance the coagulation or impart certain characteristics to the extrusion product, such as oxidation inhibitors, colloids, soaps, mineral acids such as hydrochloric acid, and sulfurous acid, soluble mineral salts, soluble salts of amino compounds such as the hydrochlorides of the above-mentioned basic coagulants, and the like. In any case, coagulants or mixtures or solutions of coagulants are chosen which are readily miscible with the solvent or solvent mixture employed to make up the polymer solution.

Although all of the above mentioned solvents and coagulants are applicable, the rate at which the coagulation takes place and the stickiness and strength of the coagulated product and the quality of the finished product depend to a large extent upon the particular solvents, coagulants and/or combinations thereof employed. In our above-mentioned copending application we have indicated a preference for an aromatic hydrocarbon solvent and a methyl alcohol, ethyl alcohol or acetone coagulant. It has now been found that much better results may be obtained with other solvents and coagulants and/or combinations thereof.

According to the preferred embodiment of our invention we employ coagulants containing at least an appreciable proportion of basic coagulants having an appreciable solubility in water and containing amino hydrophile groups, such as those listed as examples of the above class 2, or acidic coagulants having an appreciable solubility in water and containing carboxyl or sulfonic acid hydrophile groups, such as those listed as examples of the above class 3. These coagulants, either singly or in various mixtures (and especially when used in aqueous solutions), when used in combination with a solvent miscible therewith, tend, in general, to exert a superior and comparatively rapid coagulation.

The solvents which we have found to be especially suitable for the preparation of polymer solutions to be "wet spun" according to the present invention may be divided into two groups viz., (1) heterocyclic ethers such as dioxane, methyl dioxane, dimethyl dioxane, morpholin, and the like, and (2) heterocyclic nitrogen bases which are insoluble or only slightly soluble in water, as quinoline, the alpha and/or gamma alkylated quinoline derivatives, and the like.

By the use of the preferred solvents and/or coagulants of our invention polymerization products of diene hydrocarbons may be fabricated into extrusion products of excellent, and in most cases superior, quality in a most practical and economical manner. We have found that the preferred solvents tend to aid, and that the preferred coagulants tend to effect, a rapid and more efficient coagulation. The efficiency of the coagulation process is not only important in that it determines the strength and ease of handling of the coagulated product, and the economy of the process, but is also of great importance since it has been found that the coagulation step controls to an unexpected extent the quality of the finished product. It has been found that improperly coagulated extrusion products, upon being subjected to the necessary final hardening treatment invariably yield weak, inferior products. The use of dioxane, morpholin, or related compounds, is also of advantage in that they allow the coagulation to be effected with water or an aqueous coagulant. This is advantageous not only because of the excellent and rapid coagulation afforded, but also in that it materially decreases the loss during the coagulation of various modifying substances, such as plasticizers, which tend to be extracted by alcoholic and similar coagulants.

Especially advantageous results may be obtained by employing the preferred solvents in combination with the above mentioned preferred coagulants. Thus, for example, with dioxane or morpholin as the solvent, an excellent and extremely rapid coagulation may be effected using water, 100% acetic acid, phenyl hydrazine, diethyl amine, a 20% aqueous solution of benzene sulfonic acid, nitrobenzene, or a 20% aqueous solution of the hydrochloride of o-phenylene diamine as the coagulant. For example, a dioxane solution of butadiene polymer is coagulated in water at about a 10 times greater rate than a benzolic polymer solution using ethyl alcohol. When using quinoline as the solvent, the basic amino coagulants, such as the mono-, di-, and tri-alkanolamines, aniline, phenyl hydrazine and the like, give excellent results. By employing the preferred solvents or the above mentioned preferred coagulants and, still better, by employing the preferred solvents in combination with the preferred coagulants, a coagulated filament having an appreciably lessened tendency to become sticky may be produced at a greatly increased rate. When spinning benzol or cyclohexane solutions of the polymer into an ethyl alcohol bath, for instance, the filament if allowed to touch itself immediately welds and cannot be separated without rupturing. Also, it often sticks to the walls of the coagulating bath if allowed to touch. When employing the preferred solvents and coagulants, according to the present invention, however, these difficulties are substantially obviated.

The tendency for the coagulated filament to be sticky or become sticky upon drying may also be materially improved by executing the coagulation at an elevated temperature. Since this has the advantages of increasing somewhat the rate of coagulation and producing a filament having an appreciably higher tensile strength, when executing the coagulation at a suitable elevated temperature the "preliminary hardening treatment" described in our abovementioned copending application may usually be dispensed with and the coagulated filament subjected directly to the "final hardening" or other desired treatment.

When carrying out the coagulation at elevated temperatures according to the preferred embodiment of the present invention, the coagulating bath may be provided with any suitable heating means capable of maintaining the coagulant at the desired temperature. In Figures I and II of the accompanying drawings, for example, the coagulating vessels 3 are shown enclosed in heating jackets 8 having inlets and outlets 9 and 10 for steam, diphenyl, diphenyl oxide, hot oil or similar heating medium. The heating means, such as the jackets 8, shown in the drawings, may, of course, be dispensed with if, for any reason, it is desired to execute the coagulation at room temperature.

The ends of the tubes, preferably above the liquid level of the coagulant, may, if desired, be cooled to prevent the escape of vapors of the coagulant liquid. Thus, in Figures I and II of the accompanying drawings, the ends of the tubes 3 are shown surounded by cooling jackets 11, provided with inlets and outlets 12 and 13 for water or other suitable cooling medium. A cooling means, such as shown, or an equivalent, is desirable in such cases where the temperature at which the coagulation is executed is near the normal boiling point of the coagulant liquid. In such cases where the temperature of coagulation is considerably below the normal boiling point of the coagulant liquid, for instance when employing a very high boiling coagulant, special cooling means may, in most cases, be dispensed with without prohibitive loss of coagulant vapors.

The coagulant may be maintained at the desired temperature in the apparatus shown in Figure III by heating the recycled coagulant. For this purpose a heating coil 26 surrounded by a suitable heating jacket 27 adapted for steam, hot oil, or other heating medium, may be inserted into the recycling line 18.

The coagulation is, in general, preferably executed at temperatures ranging from about 90° C. to temperatures of about 160° C. In all cases, however, the temperature at which the coagulation is executed is preferably somewhat below the boiling point of the coagulant under the prevailing pressure. While temperatures in this range have been found to give the best results, lower temperatures, for instance from about 60° C. to about 90° C. may be used and are definitely superior to coagulation at room temperature. If it is desired to use as a coagulant a material having a normal boiling point appreciably under 100° C., the coagulation may, for example, be advantageously executed at a temperature at which the vapor pressure of the coagulant liquid is from about 500 to 700 mm. In general, in order to avoid the use of super-atmospheric pressures while executing the coagulation within the desired temperature range it is most convenient to employ combinations of solvents and coagulants yielding coagulating liquids having normal boiling points of at least 100° C. Such advantageous combinations are, for example, quinoline-aniline, quinoline-ethanolamine, quinoline-diethanolamine, quinoline-triethanolamine, morpholin-20% aqueous solution of the hydrochloride of o-phenylene diamine, morpholin-nitrobenzene, dioxane-20% aqueous solution of benzene sulfonic acid, dioxane-aqueous ethylene glycol, and the like.

The filaments coagulated at elevated temperatures, according to the preferred embodiment of our invention (and in many instances those coagulated at room temperature, if the preferred solvents and coagulants are employed), are, in general, substantially free from stickiness and do not generally tend to become sticky upon drying. Those coagulated at the preferred higher temperatures have moreover an appreciably improved tensile strength and can be handled without first subjecting them to a preliminary hardening treatment. They may, if desired, be washed in a suitable bath to neutralize and/or remove any remaining coagulant and/or be subjected to one or more special treatments such as stretching, rolling, embossing, partial vulcanization, coloring, fire proofing, crimping, weighting or the like, or may be directly subjected to a final hardening treatment. The filaments so produced, especially if hardened according to the method of our copending application Serial No. 204,226, filed April 25, 1938, are free from discoloration, have an excellent and, in general, superior tensile strength, have the requisite extensibility have a low inflammability, and do not become brittle upon ageing. They may be twined, either as staple fibers of any desired length or as continuous lengths and may be woven either alone or intertwined and/or interwoven with other filaments such as viscose silk, acetate silk, wool, cotton, flax, etc., to give textile materials of general usefulness. Threads, fabrics, twines and the like composed entirely of the filaments of the present invention, due to their inertness to various acids, alkalis, solvents, etc., and to their excellent physical properties are especially adapted for many industrial applications such as, for instance, the insulation of cables and other electrical apparatus, chemical and solvent resisting fabrics for clothing, filter cloths, hoods, bags, etc.; and the like.

Various aspects of the invention are illustrated, but not limited, by the following examples.

*Example I*

A polymerized product prepared by polymerization of butadiene of 95% purity in an autoclave at a temperature of 15–20° C. in the presence of about 5% of metallic sodium, was dissolved, after having been worked up, in benzene to a concentration of about 10% and the solution obtained carefully filtered to remove any solid foreign matter. The clear polymer solution was then spun into a coagulant consisting of ethyl alcohol, at room temperature. The coagulating filament passed substantially vertically downward through the coagulant in a V-shaped apparatus similar to that shown in Figure I of the attached drawings (except that heating and cooling means were not provided), and, after passing under guides rollers near the vertex of the V, was withdrawn from the inclined leg, the coagulation taking place over a distance of approximately 175 cm. The coagulant flowed slowly countercurrent to the filament.

The freshly coagulated filaments were sticky, had a very low tensile strength and great extensibility and required a preliminary hardening treatment before they could be handled. Notwithstanding the facts that a less preferred solvent and less preferred coagulant were used and that the coagulation took place at room temperature, by the use of this method of spinning fine, somewhat stretched filaments were spun at a rate of from about 5 to about 10 meters per minute without rupture of the filament.

Example II

When applying the dioxane solution of the butadiene polymer instead of a benzene solution, the coagulation took place much more rapidly and the coagulated filament was strikingly less extensible and less sticky. Although the filaments would stick together, if contacted, they could be easily separated by a slight tension. This was not the case, however, with the filaments produced in Example I by coagulation from a benzene solution.

Example III

A butadiene polymer prepared in a manner similar to that described in Example I was dissolved, after being worked up, in dioxane to a concentration of about 10% and the solution carefully filtered. The clear polymer solution was spun vertically at room temperature into a coagulant containing methyl alcohol, ethyl alcohol and water in an apparatus embodying the principles of that shown in Figure III in the accompanying drawings. A fine, well coagulated and relatively non-sticky filament having a relatively low extensibility was produced at a rate of from 50 to 60 meters per minute.

Example IV

A 6.7% solution of butadiene polymer in dioxane was spun vertically into water. The coagulation was found to take place at a 10 times faster rate than was the case when spinning a benzene solution into ethyl alcohol.

Example V

A 7% solution of butadiene polymer in dioxane was spun vertically at 18° C. into an aqueous coagulant in an apparatus embodying the principles of the apparatus shown in Figure III. The vertical coagulating chamber was about 8 cm. in diameter by about 150 cm. long. The constricted channel, placed at the bottom, was about 3 mm. in diameter by about 4 cm. long. The spinning rate at the spinning nozzle was about 10 meters per minute whilst at the bottom of the tube the rate was about 60 meters per minute, from which it follows that a stretching of about 600% occurred. In a period of about 30 minutes about 1800 meters of a filament having a diameter of approximately 0.01 mm. was produced without any rupture occurring.

While the present invention is primarily concerned with the fabrication of artificial threads from polymerization products of diene hydrocarbons, especially butadiene, the invention is likewise applicable to the fabrication of other extrusion products of small cross sections. For example, ribbons, foils and the like may be made by applying suitably shaped orifices or by rolling or otherwise reforming the still plastic coagulated filament. The products, after hardening are, in general, non-hygroscopic, unaffected by weather changes, exceptionally impervious to moisture, unaffected by common solvents, unaffected by most acids and bases, relatively non-inflammable, have excellent dielectric properties, and are therefore adapted for many special purposes.

The present application is a continuation-in-part of our copending application Serial No. 197,032, filed March 19, 1938, now Patent No. 2,198,927.

We are aware that many details of our invention may be varied considerably without departing from the principles thereof. We, therefore, do not desire our invention to be limited to the specific embodiments herein disclosed except as defined in the appended claims, construed as broadly as permissible in view of the prior art.

We claim as our invention:

1. In a process for the production of an extrusion product, the step of extruding into an aqueous acidic coagulation liquid containing an organic acid maintained at a temperature in the range of from 60° C. to 160° C. a solution comprising a polymerization product of a diene hydrocarbon dissolved in a heterocyclic ether which is miscible with said aqueous acid coagulation liquid.

2. In a process for the production of an extrusion product, the step of extruding into an acidic coagulation liquid containing an organic acid and maintained at a temperature in the range of from 60° C. to 160° C. a solution comprising a polymerization product of a diene hydrocarbon dissolved in a heterocyclic ether which is miscible with the coagulation liquid.

3. In a process for the production of an extrusion product, the step of extruding into an aqueous coagulation liquid maintained at a temperature in the range of from 60° C. to 160° C. a solution comprising a polymerization product of a diene hydrocarbon dissolved in a heterocyclic ether which is miscible with the coagulation liquid.

4. In a process for the production of an extrusion product, the step of extruding into an aqueous basic coagulation liquid containing a water-soluble organic amino compound and maintained at a temperature in the range of from 60° C. to 160° C. a solution comprising a polymerization product of a diene hydrocarbon dissolved in a heterocyclic ether which is miscible with the coagulation liquid.

5. In a process for the production of an extrusion product, the step of extruding into a basic coagulation liquid containing a water-soluble organic amino compound and maintained at a temperature in the range of from 60° C. to 160° C. a solution comprising a polymerization product of a diene hydrocarbon dissolved in a heterocyclic ether which is miscible with the coagulation liquid.

6. In a process for the production of an extrusion product, the step of extruding into a coagulation liquid maintained at a temperature in the range of from 60° C. to 160° C. a solution comprising a polymerization product of a diene hydrocarbon dissolved in a compound of the group consisting of the heterocyclic ethers and heterocyclic nitrogen bases which are miscible with the coagulation liquid.

7. In a process for the production of an extrusion product, the step of extruding into a coagulation liquid maintained at a temperature in the range of from 60° C. to 160° C. a solution comprising a polymerization product of a diene hydrocarbon dissolved in a heterocyclic ether which is miscible with the coagulation liquid.

8. In a process for the production of an extrusion product, the step of extruding into a coagulation liquid maintained at a temperature in the range of from 60° C. to 160° C. a solution comprising a polymerization product of a diene hydrocarbon dissolved in a heterocyclic nitrogen base which is miscible with the coagulation liquid.

9. In a process for the production of an extrusion product, the step of extruding into an aqueous coagulation liquid maintained at a temperature in the range of from 60° C. to 160° C. a solution comprising a polymerization product of a diene hydrocarbon dissolved in dioxane.

10. In a process for the production of an extrusion product, the step of extruding into a coagulation liquid consisting of aniline maintained at a temperature in the range of from 60° C. to 160° C. a solution comprising a diene hydrocarbon dissolved in quinoline.

HEIN ISRAEL WATERMAN.
WILLEM LEENDERT JOHANNES DE NIE.